United States Patent [19]

Matsumoto

[11] Patent Number: 5,038,218

[45] Date of Patent: Aug. 6, 1991

[54] IMAGE PROCESSING ASSEMBLY WITH CONVERSION AND ROTATION OF INPUT IMAGE DATA OR PREDETERMINED DATA TO MATCH DATA RESOLUTION AND ORIENTATION

[75] Inventor: Fuminari Matsumoto, Kanagawa, Japan

[73] Assignee: Fuji Xerox Co., Ltd., Tokyo, Japan

[21] Appl. No.: 595,885

[22] Filed: Oct. 10, 1990

[51] Int. Cl.⁵ ............ H04N 1/23; H04N 1/21; H04N 1/387; G06F 15/66

[52] U.S. Cl. .................... 358/296; 358/444; 358/448; 364/519

[58] Field of Search ............ 358/296, 401, 404, 444, 358/442, 298, 445, 448, 455, 456; 364/519, 518

[56] References Cited

U.S. PATENT DOCUMENTS 4,841,375  6/1989  Nakajima ............ 358/442

Primary Examiner—Benjamin R. Fuller
Assistant Examiner—Scott A. Rogers
Attorney, Agent, or Firm—Finnegan, Henderson, Farabow, Garrett and Dunner

[57] ABSTRACT

An image processing assembly combines a first input of copied image data and a second input of electronic data from a word processor, personal computer, or the like. A selector alternately inputs the image data and electronic data to a storage device. A control device compares the resolution and orientation of the two types of data to each other. Where the resolution does not match, the resolution of one type of data is converted to the resolution of the other type of data. Where the orientation does not match, one type of data is rotated to match the orientation of the other type of data. The properly converted and oriented data are combined and printed out.

9 Claims, 5 Drawing Sheets

IMAGE PROCESSING ASSEMBLY WITH CONVERSION AND ROTATION OF INPUT IMAGE DATA OR PREDETERMINED DATA TO MATCH DATA RESOLUTION AND ORIENTATION

BACKGROUND OF THE INVENTION

1. Field of the Invention

The present invention relates to an assembly for electronically processing images. More particularly, the present invention relates to an image processing assembly used with an electrophotographic copying machine, which can produce an image of data from a copying device combined with electronic data prepared by personal computers, word processors or the like.

2. Discussion of the Related Art

An electrophotographic copying machine having high copying speed and high copy quality is frequently used in combination with an automatic document feeder, a sorter receiving different sets of copies, and the like. Such a systematized copying machine saves a great deal of labor.

In the conventional electrophotographic copying machine, light reflected on the surface of an original document is guided and imaged on a photoreceptor by means of a lens. Accordingly, the input of an image and the exposure of the photoreceptor to the light progresses concurrently. This indicates that the conventional copying machine only functions to copy original documents. Recently, a digital copying machine has been developed and used, which receives image data from an input image terminal, electronically processes the image data, and outputs through an image output terminal.

FIG. 7 is a block diagram showing a digital copying machine capable of electronically processing image data.

In the digital copying machine, an image input terminal (IIT) 20 reads an image on an original document by using a CCD line sensor, and converts an analog video signal as gathered into a digital signal. An image processing system (IPS) 21 executes signal correction and the like, converts the corrected signal into a two-level signal, and stores it into a data storage unit 22.

In an image output terminal (IOT) 23, the two-level data is read out of the storage unit, while a light source, such as a laser, is turned on and off according to the two-level data, forming pixels on the photoreceptor. In this way, the image of the original document is reproduced.

With the digital copying machine handling digital image data, an attempt has been made to couple the copying machine with external devices, such as personal computers (PCs) and facsimile (FAX) machines. The IOT is commonly used with such external devices. To this end, a selector 24 is used to selectively couple the IIT 20 of the copying machine with any of these external devices. To obtain a hard copy of the output data of a desired external device, the selector 24 is switched from the IIT to the external device, e.g., a personal computer or a facsimile machine, and the two-level data from the external device is output in the form of a hard copy.

Character data output from the PC or a word processor usually takes the form of JIS or ASCII code data. When receiving this type of code data, the copying machine converts the code data into bit map data by a bit mapping circuit 26, and then transfers the bit map data to the IOT. When receiving the image data from the facsimile, the copying machine decompresses the image data as compressed in the transmitter, into the original image data, and then transmits it to the IOT.

In the digital copying machine of this type which shares the output device of the PC or FAX, the copying machine and the external devices are functionally isolated from one another. Of the output data from those devices, the data which reaches the machine first is accepted for output. Thus, the digital copying machine is a mere combination of the copying machine and the external devices. The printer of the PC, for example, is also used by the copying machine.

Let us consider a case where a set of documents, which may consist of hand-written documents, prints that can be used as original documents for a digital copying machine, and documents electronically prepared by a PC or a word processor (WP), is prepared by using a digital copying machine having both the copying function and the printing function of the external device. In this case, the electronically prepared documents are printed out in the form of hard copies. These hard copies are then combined with the hand-written documents and the combined documents are properly edited to form a set of documents to be copied. Then, the set of documents are read and copied by the digital copying machine, and output in the form of copies from the copying machine.

The preparation of documents in the manner just described consumes a great deal of time and labor.

The documents electronically prepared by the PC or the WP consist of digital data. When digital data is input at the digital copying machine and copied by the copying machine, the image quality of the hard copies is excellent. However, when the electronic documents are printed out as hard copies by a PC or WP, and the hard copies are then input to the digital copying machine and copied, the image quality of the output copies is relatively poor.

Documents received by a facsimile are widely used. In the facsimile, electrical signals obtained by an image read device are processed under a predetermined rule, and are transmitted in the form of digital signals. Accordingly, the image signal of the facsimile can be decoded and input to and printed by the electrophotographic printing unit. However, when the documents derived from the receiver of the facsimile are copied by the electrophotographic copying machine, the image quality of the resultant image is inevitably degraded.

SUMMARY OF THE INVENTION

The present invention has been made in view of the above circumstances and has an object to provide an image processing system in use with an electrophotographic copying machine which handles two types image data, one derived from an image read device and the other from external devices, which can reduce the time and labor required to edit documents, and produce documents of high image quality.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, an image processing assembly includes a first data supply means for supplying a plurality of image data copied from an original document having a predetermined orientation and resolution, a second data supply means for generating and supplying a plurality of electronic data having a predetermined orientation and resolution, storage means for storing the image data and electronic data, selector means for alternately selecting the image data and electronic data and inputting the selected data to the storage means, resolution conversion means for converting the resolution of one of the electronic data and image data to match the resolution of the other of the electronic data and image data, data rotating means for rotating the orientation of one of the electronic data and image data to match the orientation of the other of the electronic data and image data, and control means for (i) controlling the storage means, selector means, resolution conversion means, and data rotating means, (ii) for comparing the resolution of the electronic data and image data and transmitting one of the electronic data and image data to the resolution conversion means at times when the resolution of the electronic data does not match the resolution of the image data, (iii) for comparing the orientation of the electronic data and image data and transmitting one of the electronic data and image data to the data rotating means at times when the orientation of the electronic data does not match the orientation of the image data, and (iv) for restoring the converted and rotated data in the storage means.

BRIEF DESCRIPTION OF THE DRAWINGS

The accompanying drawings, which are incorporated in and constitute a part of this specification illustrate a preferred embodiment of the invention and, together with the description, serve to explain the object, advantages and principles of the invention. In the drawings.

DETAILED DESCRIPTION OF THE PREFERRED EMBODIMENT

The image processing assembly of the invention has select means for selecting image data from among at least two types of image data, storage means for storing the two types of image data, converting means for converting a resolution of one type of the image data to another, data rotating means for rotating image data, control means for controlling the respective means, and reading the image data from the storage means in a predetermined order, and outputting the image data as read out. The control means includes means for determining whether or not the resolution and the print orientation (or direction relative to the page) of the first type of image data are equal to those of the second type of image data. If the resolutions and the print orientation are respectively not equal to each other, the resolution converting means and the data rotating means are operated to make the resolutions and the print orientation respectively equal to each other.

With such an arrangement, the image processing assembly receives two types of image data, the image data derived from an image input terminal and the electronic data derived from any of a plurality of external devices, such as personal computers, word processors and facsimile machines. The image processing assembly automatically detects the resolution and the print orientation of, for example, the electronic data. When the resolution of the electronic data is different from that of the image data from the image input terminal, the image processing system rotates its resolution so that both the resolutions are equal to each other. When the print orientation of the electronic data is not coincident with that of the image data from the image input terminal, the image processing system converts its print orientation so that both the print directions are coincident with each other. Then, the data is output to the image output terminal. As a result, the time to edit is reduced, and the image quality of the documents as output is excellent.

A preferred embodiment of an image processing system according to the present invention will now be described with reference to the accompanying drawings.

Figure 1:
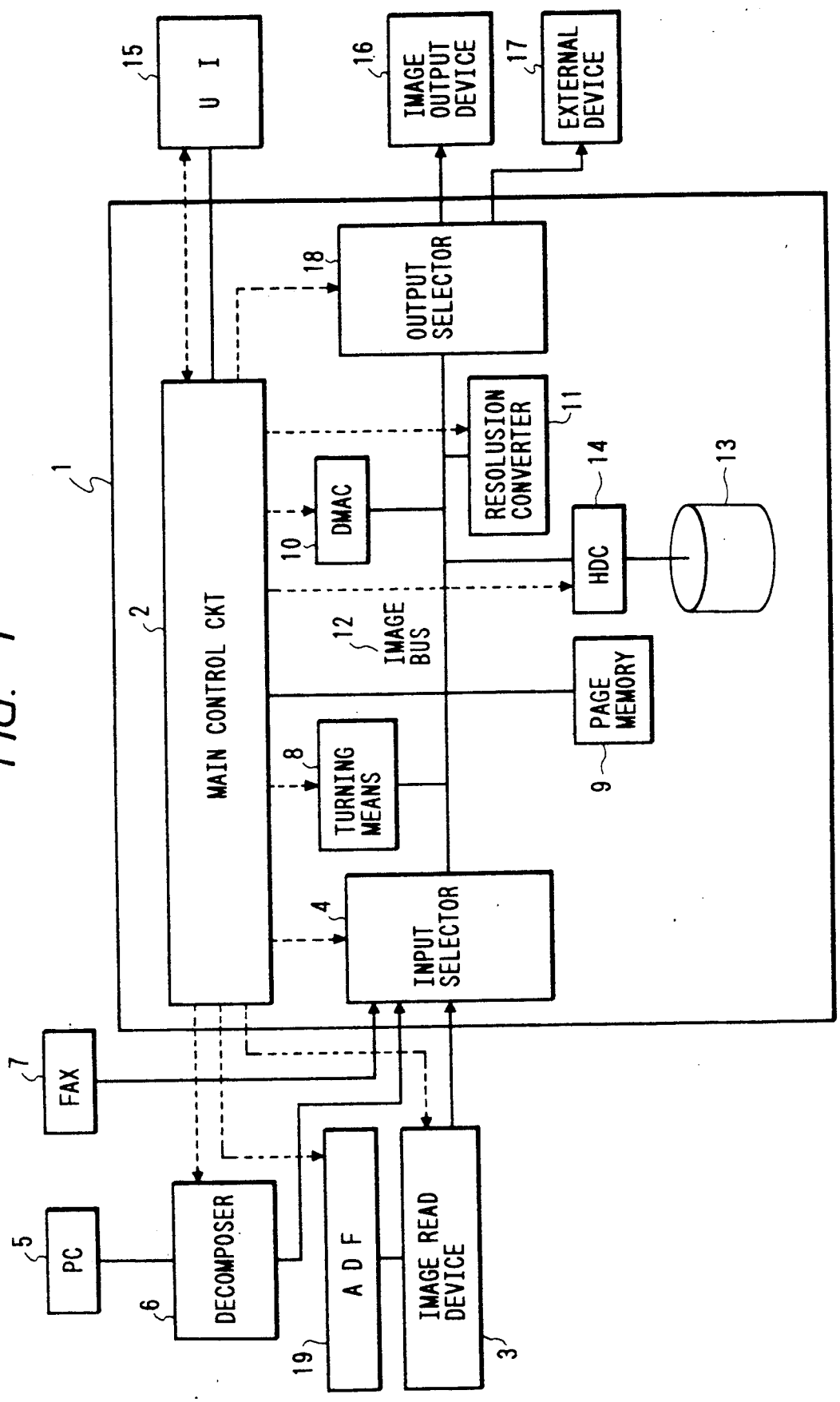
FIG. 1 is a block diagram showing an embodiment of an image processing system according to the present invention.

FIG. 1 is a block diagram showing an embodiment of an image processing assembly according to the present invention.

A main control unit 1 is made up of the following components. Main control circuit 2 controls the related portions of the system and editing image data. An image read device 3 is provided. An input selector 4 selects the image data as read by the image read device 3 or the data output from an external device. A decomposer 6 generates a bit map signal by using a code signal from a personal computer 5. A data rotating means 8 is capable of changing the orientation of the image data output from another input device, such as a facsimile, in 90 degree increments, for example. A page memory 9 stores image data for every page. A DMAC (direct memory access controller) 10 controls the transfer of image data. A resolution converter 11 converts the resolution when the resolution of the image data are different from each other. An image bus 12 transfers image data. A hard disk 13 functions as a memory for storing a tremendous amount of image data. A hard disk controller (HDC) 14 controls the hard disk. A user interface 15 enables a user to enter instructions to the system and displays the status of the system. An output selector 18 selects an image output terminal 16 or the image data output port to another device.

The image read device 3 is a device which reads an image on a document by a CCD sensor, for example. The image read device 3 executes the following operations: the offset adjustment and the gain adjustment of the read image signals, conversion of analog image data into digital image data, gap correction, shading correction, and the like. For a color document, the image read device 3 reads a color document and produces image data of three primary colors, R (red), G (green), and B (blue), and applies to the image data various processings of END (equivalent neutral density conversion), color masking, document size detection, color changing, UCR (under color removal), black generation, mesh-point removal, edge emphasis, TRC (tone reduction control), enlargement/reduction, edits, and the like.

An ADF (automatic document feeder) 19 is coupled with the image read device 3, and automatically feeds original documents to be read, in successive order.

An image output section 16 is a laser printer which controls the on/off of a laser beam every pixel according to two-level data as generated from the image data, and reproduces a halftone image with mesh dots.

Where the print output signal of a personal computer is a JIS or ASCII code signal, for example, a decomposer 6 converts the code signal into a bit map signal.

When the print orientation of the image data is not coincident with that of the image data output from the image input terminal, the data rotating means 8 rotates the image data from the external device in regular increments, for example, increments of 90 degrees. The rotating means 8 arranges the orientation of the printed matter as output from the image output terminal in the same direction, and provides easy-to-use documents.

When the resolution of the image data from the external device is different from that of the image input terminal, the resolution converter 11 converts its resolution. In the digital copying machine, a high image quality is required. Because of this, the image is output at 400 dpi (dots per inch). In the PC, it is output at 240 dpi. In the facsimile, it is output at 200 dpi. To output the image data with different resolutions in the form of a series of hard copies, those different resolutions must be converted.

The resolution conversion is also required when the image is enlarged or reduced in size.

The page memory 9 is a semiconductor memory for storing the image data of one page in order to turn the image data and to convert the resolution. With provision of the page memory, the time consuming processes in which the image data is fetched every line, such as the turning of image data and the conversion of resolution, can be performed at high speed.

The hard disk 13 has a large memory capacity of several megabytes to several hundred mega-bytes, and stores the image data from the image input terminal and the external devices. With storage of the image data by the hard disk, the image data from the image input terminal and the image data from the external devices may be output in a desired order of pages to the image output terminal.

To effectively utilize the memory capacity of the hard disk, the image data is compressed, by a compressor, to be reduced before it is stored into the hard disk. At the time of outputting the image, the image data is read out of the hard disk and decompressed into the original image data by a decompressor before it is transferred to the image output terminal. With this, the amount of image data that can be handled by the hard disk is increased. Accordingly, the hard disk can handle the image data of an increased number of pages.

A great amount of image data is written into and read out of the hard disk under control of the hard disk controller 14.

The user interface (UI) 15 is constructed with a display, such as a CRT or a liquid crystal display, a control panel, and the like. The UI 15 is used for entering the instructions of various types of edits and for displaying status of the copying machine.

Let us consider a case where the image data of three pages are entered from the image input terminal to the copying machine, and the electronic data of one page is entered to the machine from the personal computer.

A user sets the set of original documents on a document receptacle of the automatic document feeder (ADF) 19, and enters a command to read images on the original documents from the UI. In response to this, the ADF 19 starts to feed the documents sheet by sheet onto the platen. The image read device reads the images, and the read images are stored into the hard disk. In the hard disk, each page of the image data is stored. The locations on the hard disk where the image data are stored is managed per page.

Figure 2:
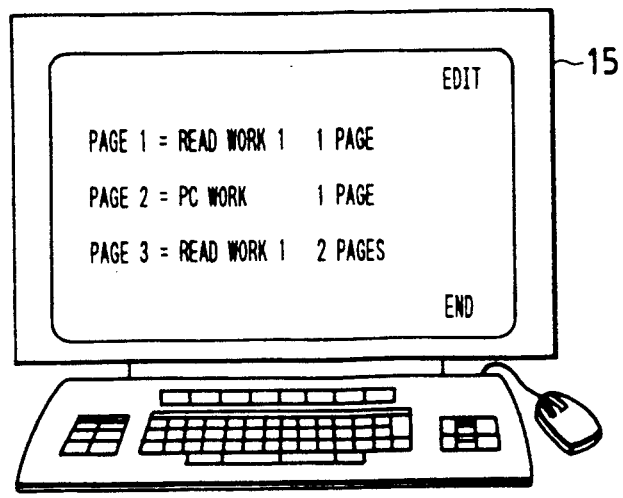
FIG. 2 is a diagram showing a screen display of a user interface of a copying machine.

FIG. 2 is a diagram showing a screen display of the user interface of a copying machine. As shown, the user interface visually presents information on the documents whose images have been stored into the hard disk and the like.

Figure 3:
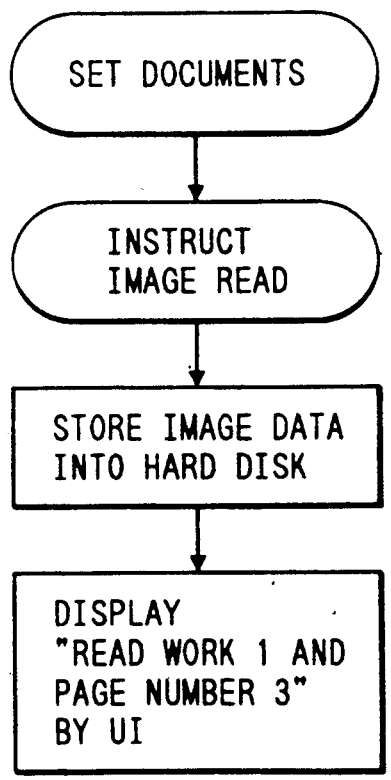
FIG. 3 is a flowchart showing a sequence of steps from setting an original to reading an image on an original document.

FIG. 3 shows a flowchart of a sequence of steps from the setting of an original to the reading of an image on an original document. The document is set, the image read is instructed, the image data as read is stored in the hard disk, and the present status of the machine is displayed by the UI 15.

Figure 4:
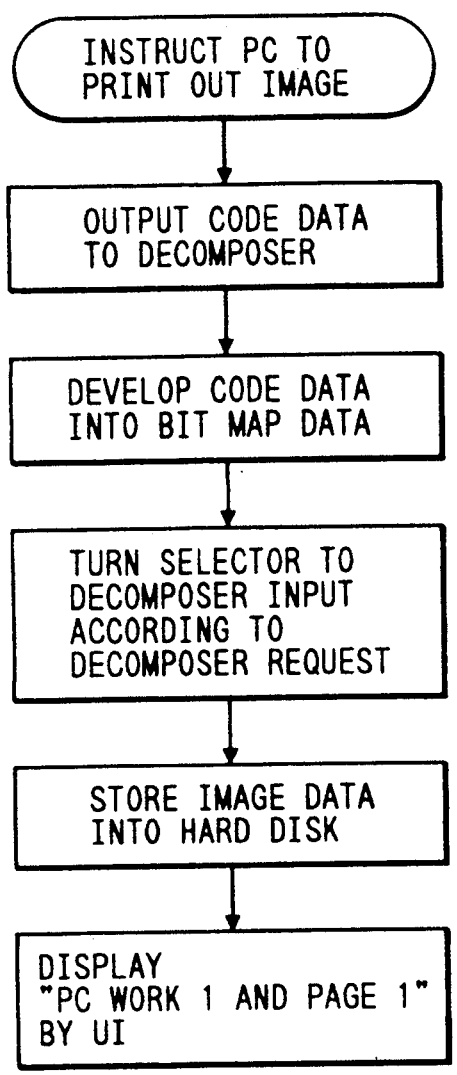
FIG. 4 is a flowchart showing a sequence of steps from instructing a personal computer to output data to storing the image data.

Subsequently, as shown in FIG. 4, the user instructs the PC (personal computer) to output its data. The decomposer 6 determines whether the output data of the PC is the bit map data or the code data. If it is the code data, the decomposer develops the code data into the bit map data. In response to a select request from the decomposer, the input selector 4 connects the decomposer through the image bus 12 to the hard disk. The image data from the decomposer is stored into the hard disk.

The user interface 15 displays the work numbers of the image data from the PC and the page numbers of the image data.

Seeing the UI, the user knows that the image data from the PC and that from the image input terminal have both been loaded into the copying machine, and enters a command into the machine to set up a page edit mode. The instruction may be entered into the machine by means of a button switch, a mouse, or a touch panel switch as are installed in the UI.

Figure 5:
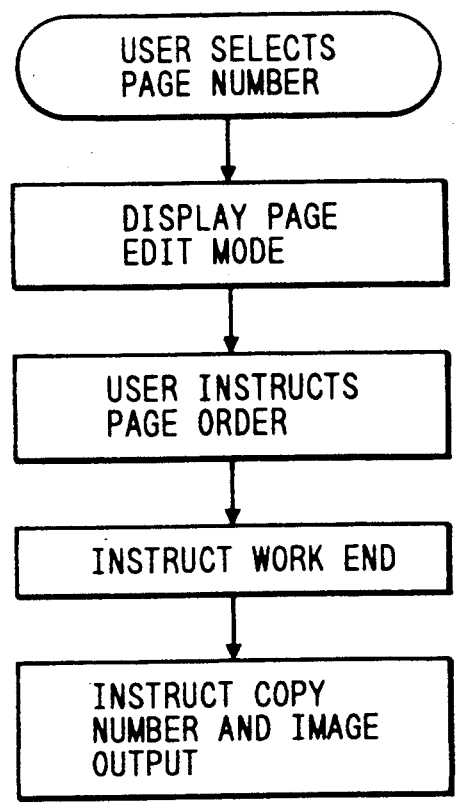
FIG. 5 is a flowchart showing a sequence of steps of making a page edit.

FIG. 5 shows a flowchart of a sequence of steps of making a page edit. The user gives the image output terminal an instruction of a page order in which the image data are output by means of a mouse, for example, which is contained in the UI 15. After entering the page order, the user enters instructions on the number of copies, paper size, and the like into the copying machine. Then, the copying machine starts to make a copy of the set of documents.

Figure 6:
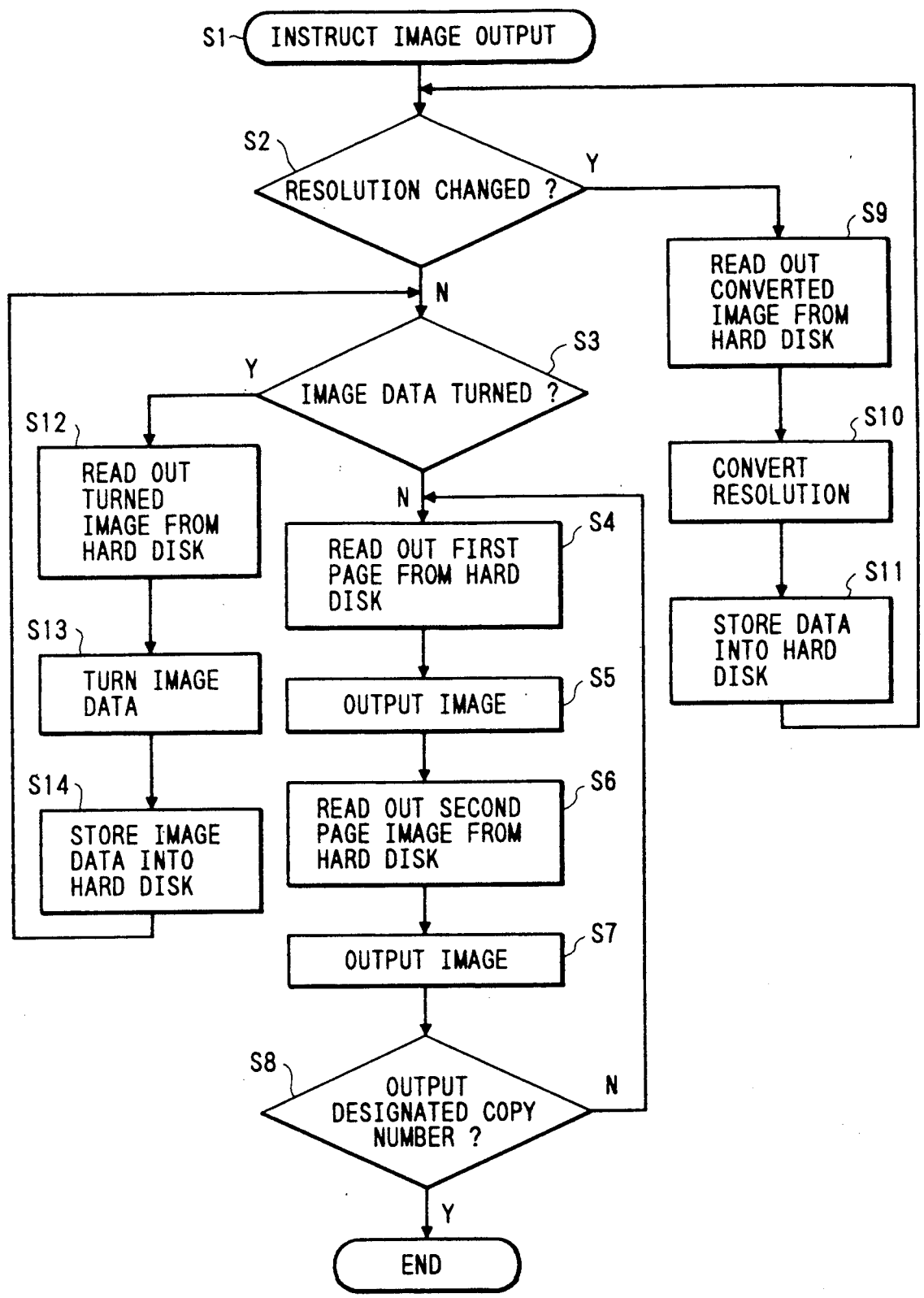
FIG. 6 is a flowchart showing a sequence of steps of outputting image data.
Figure 7:
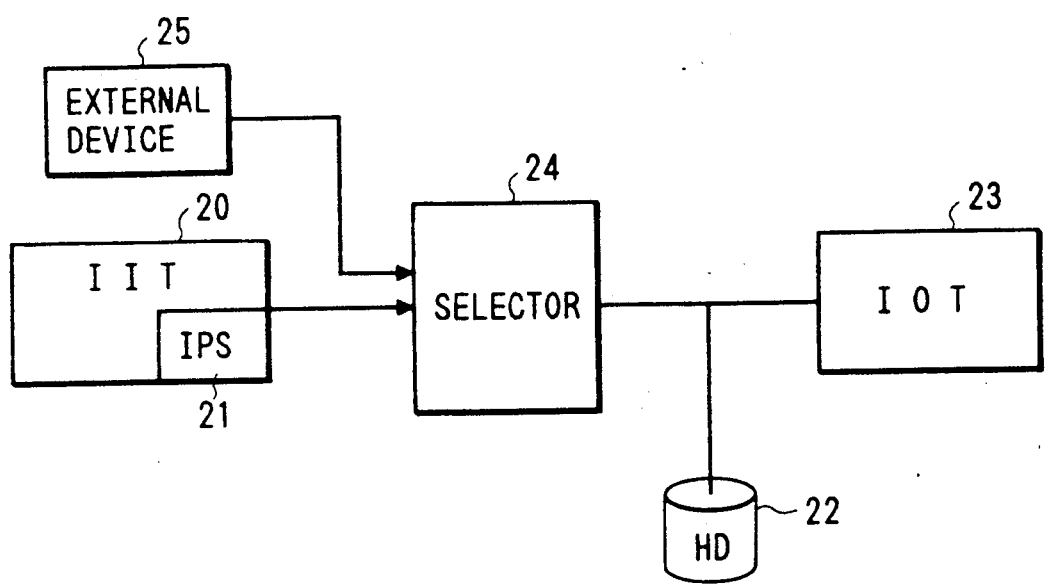
FIG. 7 is a block diagram showing an electrophotographic copying machine with an arrangement to electronically process image data.

A flowchart of the image output operation, in response to the copy start command, is shown in FIG. 6. The control circuit checks whether or not the resolution of the image data stored in the hard disk is equal to that from the image output terminal, or whether or not the magnification must be changed in connection with the paper size. If resolution conversion is required, the image data is read out of the hard disk. In the page memory, the resolution conversion is made. The data is then returned to and stored in the hard disk.

Further, the control circuit checks whether or not the print orientation of the image data is proper or must be rotated. If required, the control reads out the image data from the hard disk, rotates it to the proper orientation, and returns the rotated image data to and stores it in the hard disk.

The image data that have been subjected to the rotation of the print direction and resolution adjustment are read out of the hard disk in order and transferred to the image output terminal. The image output terminal outputs a necessary number of hard copies.

To output the hard copies with its image surfaces facing up, the copies are output an reverse order so that the hard copy of the last page is output first.

The image processing system contains a page memory capable of storing the image data of at least one page. With this, various edits can be made. For example, the image data can be read out of the hard disk and loaded into the page memory. A part of the image can be cut, and another image can be inserted in its place. The edited data can then be returned to the hard disk. The image data are then read out in order.

For routine manual operation of the image processing system, programs of routine operations may be prepared and stored in an appropriate memory in the machine. To operate the image processing system, all the operator must do is enter a command to execute the desired program. The machine will automatically execute the copying and image output operations in accordance with the program.

As seen from the foregoing description, the image processing system according to the invention receives two types of image data, the image data derived from an image input terminal and the electronic data derived from external devices, such as personal computers, work processors and facsimiles. The image processing system automatically detects the resolution and the print orientation of the electronic data. When the resolution of the electronic data is different from that of the image data from the image input terminal, the image processing system converts its resolution so that the resolution of both types of data are equal to each other. When the print orientation of the electronic data is not coincident with that of the image data from the image input terminal, the image processing system changes its print orientation so that the orientation of both types of data are coincident with each other. Then, the data is output to the image output terminal. Thus, the image processing system automatically performs the edit operations that would otherwise be manually performed by the user. Work time is reduced and the resultant documents have images of high quality.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing assembly comprising:

a first data supply means for supplying a plurality of image data copied from an original document having a predetermined orientation and resolution;

a second data supply means for generating and supplying a plurality of electronic data having a predetermined orientation and resolution;

storage means for storing said image data and electronic data;

selector means for alternately selecting said image data and electronic data, and inputting the selected data to said storage means;

resolution conversion means for converting the resolution of one of said electronic data and image data to match the resolution of the other of said electronic data and image data;

data rotating means for rotating the orientation of one of said electronic data and image data to match the orientation of the other of said electronic data and image data; and control means (i) for controlling said storage means, selector means, resolution conversion means, and data rotating means, (ii) for comparing the resolution of said electronic data and image data and transmitting one of said electronic data and image data to said resolution conversion means at times when the resolution of said electronic data does not match the resolution of said image data, (iii) for comparing the orientation of said electronic data and image data and transmitting one of said electronic data and image data to said data rotating means at times when the orientation of said electronic data does not match the orientation of said image data, and (iv) for restoring the converted and rotated data in said storage means.

2. An assembly according to claim 1, wherein said first data supply means includes a networked image processing assembly.

3. An assembly according to claim 1, wherein said second data supply means includes at least one device from the group consisting of a word processor, a personal computer, and a facsimile machine.

4. An assembly according to claim 1, further including editing means for editing said image data and said electronic data stored in said storage means.

5. An assembly according to claim 1, further including printing means for printing an output image including a combination of said electronic data and image data.

6. An assembly according to claim 1, wherein said data rotating means rotates said data in 90° increments.

7. An assembly according to claim 1, wherein said electronic data is transmitted to said resolution converting means by said control means.

8. An assembly according to claim 1, wherein said electronic data is transmitted to said data rotation means by said control means.

9. An image processing assembly for producing an image containing a combination of image data copied from an original document and electronic data from an electronic data source, the image data and electronic data having a predetermined orientation and resolution, the assembly comprising:

storage means for storing the image data and electronic data;

selector means for alternately selecting the image data and electronic data, and inputting the selected data to the storage means;

resolution conversion means for converting the resolution of one of said electronic data and image data to match the resolution of the other of said electronic data and image data;

data rotating means for rotating the orientation of one of said electronic data and image data to match the orientation of the other of said electronic data and image data; and control means (i) for controlling said storage means, selector means, resolution conversion means, and data rotating means, (ii) for comparing the resolution of said electronic data and image data and transmitting one of said electronic data and image data to said resolution conversion means at times when the resolution of said electronic data does not match the resolution of said image data, (iii) for comparing the orientation of said electronic data and said image data and transmitting one of said electronic data and image data to said data rotating means at times when the orientation of said electronic data does not match the orientation of said image data, and (iv) for restoring the converted and rotated data in said storage means.

* * * * *